Oct. 5, 1937.    T. FALCK MUUS    2,095,074
PROCESS FOR THE PRODUCTION OF SULPHATE OF AMMONIUM
Filed Sept. 10, 1934
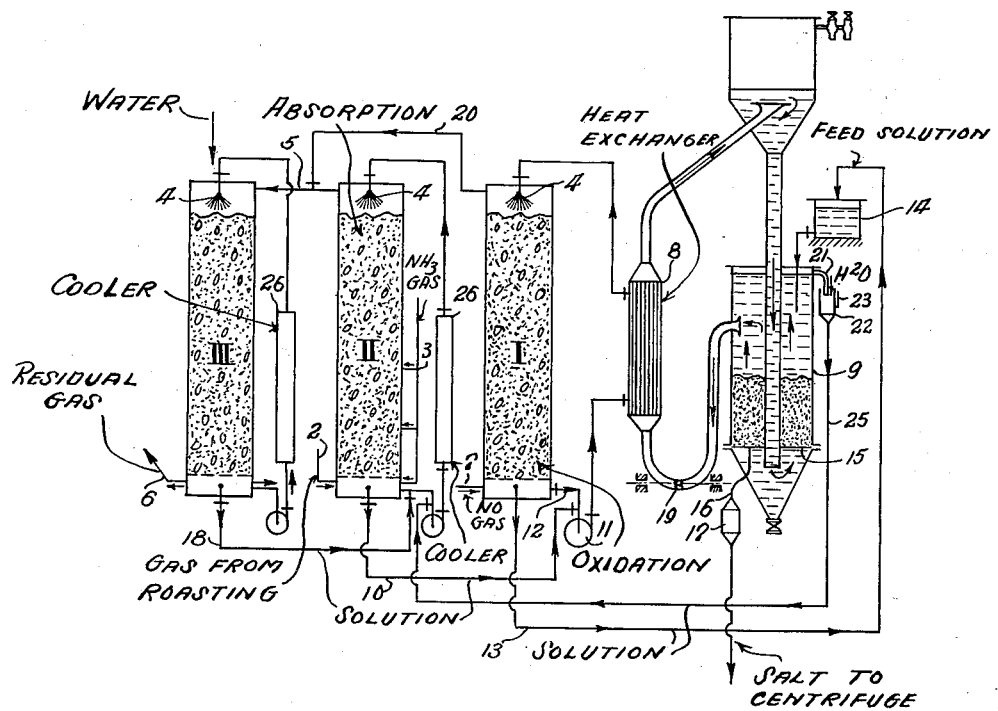
Thor Falck Muus Patented Oct. 5, 1937

2,095,074

UNITED STATES PATENT OFFICE 2,095,074

PROCESS FOR THE PRODUCTION OF SULPHATE OF AMMONIUM

Thor Falck Muus, Rjukan, Norway, assignor to Norsk Hydro-Elektrisk Kvaelstofaktieselskab, Oslo, Norway Application September 10, 1934, Serial No. 743,365
In Norway September 12, 1933

4 Claims. (Cl. 23—119)

This invention relates to the manufacture of sulphate of ammonium and has for its object a process in which sulphate of ammonium is obtained from sulphite of ammonium by oxidation.

A known process for the production of sulphate of ammonium consists in the oxidation of a solution of sulphite of ammonium with air, oxygen or other material with or without the aid of catalysts. In this prior process the oxidation may be performed by treating the solution with nitrous gases, as suggested by Dr. Paul Fritzsche in the German patent application No. F. 33,287 (Zeitschrift für angewandte Chemie, Referatenteil, 26th annual 1913, page 209).

As sulphite of ammonium and bisulphite may easily be produced by means of ammonia, sulphur dioxide and water, this process should be more advantageous than the conventional one, which consists in neutralizing sulphuric acid with ammonia, because the erection and running of a sulphuric acid plant may be avoided. It has, however, proved to be connected with difficulties to carry out the process in an economical manner, and this is most likely to be the reason why it has so far not been utilized in the industry. The principal ground for this is that the process has been performed in diluted solutions and it has therefore been necessary to evaporate the oxidized solution to recover solid sulphate of ammonium, and thus the expenses have become too heavy. It is known that in the conventional process of manufacturing sulphate of ammonium, crystallized sulphate is obtained directly by neutralizing sulphuric acid with ammonia. No expenses for evaporation are incurred by this process.

According to the present invention a solution of sulphite of ammonium is obtained, which is oxidized into a solution of sulphate, from which the solid salt is allowed to crystallize without extra evaporation expenses, as the heat which is generated during the process may be utilized to evaporate the solution, from which the sulphate of ammonium is crystallized.

An embodiment of the invention is diagrammatically illustrated in the attached drawing.

Sulphur dioxide or gases containing sulphur dioxide, for instance roaster gases, and ammonia are conducted by the conduits 2 and 3 respectively into an absorption tower II, where in the presence of water, sulphite of ammonium is formed. The water is conducted into the tower II through the shower-apparatus 4 as a weak solution of sulphite of ammonium. The outlet gases from this tower are led through the conduit 5 into the top of another tower III, into which water, e. g., including recirculated sulphite containing water, is added through a similar shower-apparatus 4, and the residual gases then leave the system through the exhaust conduit 6. From tower III a conduit 18 leads to the tower II; through this conduit the weak sulphite solution is conducted from the tower III to the absorption tower II, where the solution is concentrated. From the bottom of the tower II the ammonium sulphite solution is conducted through the conduit 10 to the pump 11, which pumps the solution firstly through the heat exchanger 8 and then to a third tower I, where air and nitrous gases are added through the conduit 7 which causes sulphite to be oxidized to sulphate in the known manner. The residual gases are conducted through the conduit 20 from the tower I to the conduit 5. In order to avoid solid salt precipitating in the towers, water is constantly added to the solution preferably through the shower apparatus 4. A part of the solution oxidized in the tower I leaves the tower through the pipe 12 and is thereupon pumped by the pump through the heat exchanger 8 together with the sulphite solution from the tower II. Coolers 26 are provided for the purpose of regulating the temperature in the absorption towers. The heat which is generated during the process is thus diverted by means of the heat exchanger 8 to a vacuum evaporation apparatus 9, where the sulphate solution formed is evaporated and the sulphate is allowed to crystallize. The transfer of heat is performed in such a manner that the hot solution from the tower system is conducted to the heat exchanger, where it gives off heat and is then led back to the tower system. The heat-exchange is thus indirect in that the two solutions are entirely separated by the walls of the apparatus 8 through which the heat must pass; and thus each solution controls the temperature of the other without intermingling.

The finished solution of oxidized sulphate in the tower I, or a part of it, is conducted firstly through the conduit 13 and a pump (not shown in the drawing) to a container 14. From this container the solution is conducted to the vacuum evaporation apparatus 9, which is connected with the heat exchanger 8 in such a way that the solution circulates through the heat exchanger and here absorbs the heat which has been conducted from the tower system. 19 indicates a propeller pump for circulating the sulphate solution in the vacuum evaporation apparatus. As the solutions from the towers when reaching the heat exchanger have a temperature of for instance 60°–70° C., whilst the solutions in the vacuum evaporation apparatus have a lower temperature, for instance 40°–50° C., sufficient heat is transferred by means of the heat exchanger in order to evaporate the superfluous water which has been used in the process.

The vacuum evaporation apparatus 9 may be of usual type for evaporating salt solutions in vacuum. The effect of the apparatus will be easily understood by people skilled in the art. The ammonium sulphate crystallized in the vacuum evaporation apparatus will, owing to the upward movement of the solution be suspended in the solution above the sieve bottom 15. The crystals, which have grown sufficiently large, will however sink down through the pipe 16 and are collected in a salt container 17, from which the crystals continuously or periodically are conducted to a centrifuge, which removes the mother liquor from the ammonium sulphate crystals.

The crystallization container is provided with an overflow 21, from which a part of the solution flows into a measuring container 22, provided with water gage 23 and a bottom nozzle, from which the solution flows into a funnel and further through a pipe 25 back to the absorption system. By means of said water gage, which is provided with empiric graduated scale, it is possible at any time to record (in cubic meters pr. hour) the amount of the solution returning to the absorption.

It has been found very advantageous to operate in such a manner that the temperature of the solution in the oxidation tower does not exceed about 60° C., as it has been proved that the oxidation then proceeds more quickly than at higher temperatures.

As will be seen, it is comparatively low temperatures which are here applied, and the process can therefore only be used in connection with vacuum evaporation. During the evaporation sulphate of ammonium is precipitated in the vacuum apparatus, which is withdrawn continuously or discontinuously according to the construction of the apparatus.

The solutions from the absorption tower and oxidation tower may either as shown on the drawing, be conducted together through the heat exchanger or separately. In the latter case it is suitable that the solutions give out their heat consecutively in the heat exchanger, as the hottest solution gives out heat to the hottest part of the heat exchanger (the upper part of the drawing). If desired, the two solutions can give out heat separately in their respective heat exchanger, coupled either parallelly or in series.

I claim:—

1. The improvement in the process of producing ammonium sulphate by reaction of sulphur dioxide and ammonia in the presence of water and oxidation of the resulting ammonium sulphite to ammonium sulphate which comprises transferring the solution resulting after the oxidizing treatment to a vacuum evaporator, evaporating water therefrom by reduction of pressure whereby its temperature is reduced, passing liquid thus cooled in the evaporator into indirect heat exchange relation to liquid in the oxidizing step and returning each liquid after heat-exchange to its respective treatment without intermingling, whereby heat generated in the formation of ammonium sulphate is utilized to evaporate ammonium sulphate solution formed in the process and the evaporation step is used to control the temperature of the sulphate formation step.

2. Process according to claim 1, in which the formation of ammonium sulphite and the oxidation of the solution obtained thereby are respectively effected at different places, and the solutions from these two steps are led through the heat exchange steps separately.

3. Process according to claim 1, in which the formation of ammonium sulphite and the oxidation of the solution obtained thereby are respectively effected at different places, and the two solutions from these steps respectively are led through the heat exchange steps.

4. The process according to claim 1, in which the temperatures of the oxidation step are maintained at not exceeding 60° C. by the evaporation and heat exchange.

THOR FALCK MUUS.